UNITED STATES PATENT OFFICE.

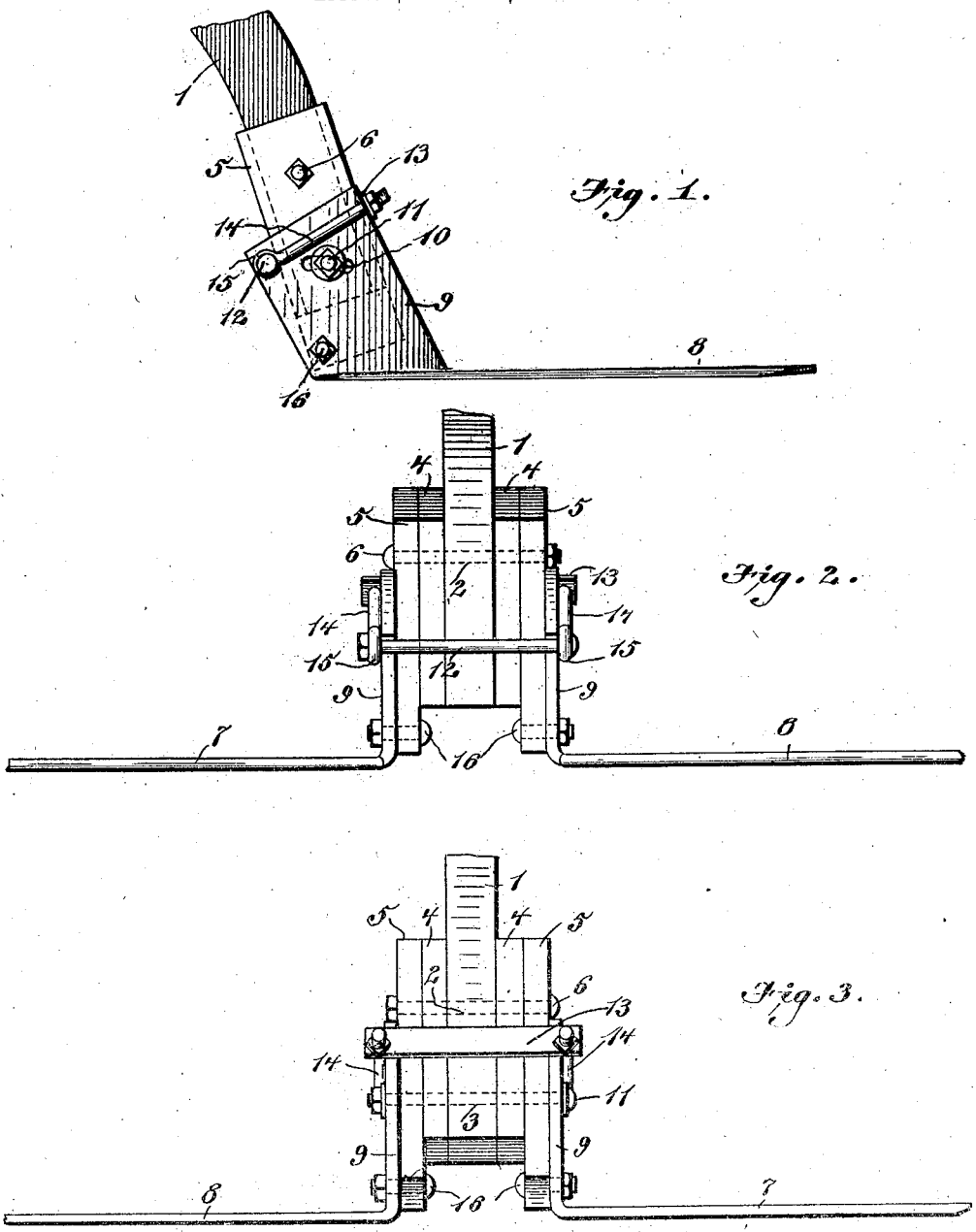

HENRY O. POPE, OF CLAUDE, TEXAS.

CULTIVATOR ATTACHMENT.

No. 843,031.     Specification of Letters Patent.     Patented Feb. 5, 1907.

Application filed June 12, 1906. Serial No. 321,366.

*To all whom it may concern:*

Be it known that I, HENRY O. POPE, a citizen of the United States, residing at Claude, in the county of Armstrong and State of Texas, have invented new and useful Improvements in Cultivator Attachments, of which the following is a specification.

My invention relates to cultivator attachments; and more particularly to an attachment to be connected to a lister or other plow and to be used in cleaning grass, weeds, or the like from the drills or rows after the planting of the ground.

My invention consists, broadly, in a pair of cutting blades or knives adapted to be adjustably connected to the lister-beam after the plow-blades have been removed and after the planting of the field, and these knives are adapted to straddle the center row and to work down to three inches under the surface of the ground, extending half-way to the adjoining row on both sides of said center row, thus absolutely killing all grass, weeds, or the like, and turning up just enough dirt to cover the scrub. By thus treating each row in succession a field may be cleared more quickly, more easily, and more thoroughly by my improved attachment than by any implement in use.

My invention also consists in certain improvements hereinafter described in detail, reference being made to the accompanying drawings, in which—

Figure 1 is a side elevation of the invention. Fig. 2 is a front elevation, and Fig. 3 is a rear elevation.

Referring to the figures, 1 represents the lister-beam with the upper and lower transversely-extending openings 2 and 3, respectively.

4 and 5 represent, respectively, the inner and outer blocks, disposed on both sides of the beam 1 and connected adjacent their upper ends to the beam 1 by means of the bolt 6, passing transversely through them and through the upper opening 2 of said beam.

7 and 8 are the cutting blades or knives disposed to the rear of the beam 1 and provided with the upturned portions 9 at an angle to said knives, and provided with curved slots 10 centrally thereof. The upturned portions 9 of said knives are connected to the beam 1 by means of bolt 11, passing through the lower opening 3 of said beam and also through the inner and outer blocks 4 and 5. and working in the slots 10 of the upturned portion 9, so that by loosening the bolt 11 the knives may be adjusted with relation to their angle toward the surface of the soil.

12 is a bolt connecting the upturned portions 9 of the knives in advance of the beam 1, and 13 is a bearing-plate disposed to the rear of said beam 1 and carrying eyebolts 14, extending along the outside of the upturned portions 9 and having their eye-portions 15, embracing the shank of the bolt 12, adjacent its ends.

16 are short bolts connecting the lower portions of the outer blocks 5, extending below the inner blocks 4 to the upturned portions 9 of the knives.

Having thus described my invention, what I claim is—

In a device of the character described, adapted to be connected to the beam of a lister or other plow, a pair of cutting-blades having upturned portions on one end provided with curved slots, a bolt passing transversely through said beam and operating in said slots, whereby an angular adjustment of said cutting-blades may be had, blocks disposed between said beam and said upturned portions through which said bolt also passes. a pivotal connection between the blocks and the upturned portions, a forward bolt connecting said upturned portion in advance of said beam, a bearing-plate disposed across said upturned portions in the rear of said beam, and eyebolts connecting said bearing-plate and said forward bolt, substantially as described.

In testimony whereof I have signed my name to this specification in the presence of two subscribing witnesses.

HENRY O. POPE.

Witnesses:
J. S. STALLINGS,
R. L. MCLAREN.